(12) United States Patent
Birdwell

(10) Patent No.: US 7,508,391 B2
(45) Date of Patent: *Mar. 24, 2009

(54) DETERMINING ILLUMINATION OF MODELS USING AN AMBIENT FRAMING ABSTRACTIONS

(75) Inventor: Kenneth J. Birdwell, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/738,978

(22) Filed: Apr. 23, 2007

(65) Prior Publication Data
US 2007/0195090 A1 Aug. 23, 2007

Related U.S. Application Data

(63) Continuation of application No. 10/841,232, filed on May 7, 2004, now Pat. No. 7,227,548.

(51) Int. Cl.
G06T 15/50 (2006.01)
(52) U.S. Cl. ..................... 345/426
(58) Field of Classification Search .......... None
See application file for complete search history.

(56) References Cited

U.S. PATENT DOCUMENTS

| | | | | |
|---|---|---|---|---|
| 5,222,203 A * | 6/1993 | Obata | | 345/426 |
| 5,710,876 A * | 1/1998 | Peercy et al. | | 345/426 |
| 6,628,298 B1 * | 9/2003 | Debevec | | 345/632 |
| 6,659,861 B1 * | 12/2003 | Faris et al. | | 463/1 |
| 7,075,530 B2 * | 7/2006 | D'Amora | | 345/419 |
| 7,091,973 B1 * | 8/2006 | Cohen | | 345/426 |
| 2003/0093466 A1 * | 5/2003 | Jarman et al. | | 709/203 |

OTHER PUBLICATIONS

Dimension3, "Project6—Lighting", Dimension3 Web Site, www.dimension3.host.sk/web/project.php?pid=Project6&page=4+PFriend=1.
Manituk et al., Cube-Map Data Structure for Interactive Global Illumination Computation in Dynamic Diffuse Environments, Sep. 2002, International Conference on Computer Vision and Graphics 2002, pp. 1-7.
McTaggart, G., Half-Life® 2/Valve Source™ Shading, Mar. 2002, Valve Corporation, pp. 1-3, 6-12, 18, 57-61, 83-86.
Pattanaik et al., "Real Time Realistic Rendering", Dec. 2002, 23rd Army Science Conference 2002, pp. 1-2.

* cited by examiner

Primary Examiner—Ulka Chauhan
Assistant Examiner—Said Broome
(74) Attorney, Agent, or Firm—Darby & Darby P.C.; Jamie L. Wiegand

(57) ABSTRACT

A system and method for determining light illumination on a model in a virtual environment. A plurality of ambient cubes are defined in the virtual environment. A plurality of lights is detected. Indirect lights are also detected. Lights incident on the ambient cubes are divided into major and minor lights. For each ambient cube, six ambient cube values are calculated, each ambient cube value being related to the aggregate light illumination at a respective side of the ambient cube by the minor lights. The light illumination caused by the major lights is determined in real-time. The determined light illumination is modified by a value related to one or more ambient cube values associated with one of the plurality of ambient cubes.

12 Claims, 7 Drawing Sheets

DETERMINING ILLUMINATION OF MODELS USING AN AMBIENT FRAMING ABSTRACTIONS

CROSS REFERENCE TO RELATED APPLICATIONS

This application is a continuation patent application of U.S. patent application Ser. No. 10/841,232, filed May 7, 2004, entitled "Method And System For Determining Illumination Of Models Using An Ambient Cube," and claims the benefit under 35 U.S.C. §120, which is further incorporated herein by reference.

FIELD OF THE INVENTION

This application relates generally to computer graphics and in particular, but not exclusively, to determining and displaying light illumination effects on the surface of a model.

BACKGROUND OF THE INVENTION

It has long been the goal of the computer arts to create compelling visual images through computer graphics. While these visual images may represent real or imaginary things, they still require that certain aspects be presented with high realism. This requirement is especially true for optics. Humans rely on light to perceive the world around them. Variations in light due to various optical interactions are decoded by our brains into information about the nature, position shape and relationship between objects in the world. For this reason, any representation in computer graphics whether realistic or fantastic requires a certain amount of optical realism in order to be properly evaluated by the human brain.

Since we live in and perceive a three dimensional world, three dimensional computer graphics are usually more compelling. Three dimensional images may be simulated on a two dimensional screen by using various "tricks" known in the visual arts. In addition, "true" three dimensional images may also be displayed by providing two slightly different images to the viewer's eyes. Regardless of how the third dimension is realized, accurate and realistic optical effects are desirable for creating three-dimensional images.

It has also been the goal of the computer arts to create dynamic or real time computer generated graphics. That is, to create images that changes in real time, preferably because of user input. Such graphics can be used in a variety of applications, such as, computer games, flight simulators, driving simulators, and the related training applications, virtual reality software, etc. Dynamic graphics usually require that a computer calculate the nature and positions of various objects and determine how to graphically represent these objects in real time. As a result, dynamic graphics require a considerable amount of processing power. To address this, preprocessing is often used.

Preprocessing refers to performing various processing actions for creating an image, at a time prior to the time when the image is to be created and when more processing resources are available. However, not all processing actions required for creating an image are possible at the preprocessing stage. In dynamic environments, some information about the placement of objects or the lighting may not be known until the time when the image is to be created. Therefore, the actions to be performed during preprocessing should be carefully selected as to use the limited information available at this stage in order to ease the processing requirements when the image is being drawn.

Environments that include a plurality of light sources are especially difficult to simulate in computer graphics. That may be the case because the combined effect of multiple light sources on particular surface depends on many factors, including the location of the surface, the orientation of the surface, and the location and intensity of each light source. Furthermore, these relationships may not be easily simplified. For example, it may be difficult to combine the effects of the multiple light sources into a single representative light source, which can be used for all surfaces, because the combined effects of multiple light sources differ greatly depending on the spatial relationship between the surface and the light sources.

Many computer graphic systems render models in an environment. Models may include moving objects, such as, for example, cars, airplanes, persons, animals, and monsters. Rendering of models poses additional difficulties. Models are often moving in a manner that may only be known at run time. Thus, for example, the movement of models in a computer game or a computer simulation depends on the actions of the user of the game or simulation and is computed in real time or near real time based on these actions. On the other hand, models often tend to catch a user's attention and thus are often rendered with a higher degree of accuracy.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENTS

Figure 1:
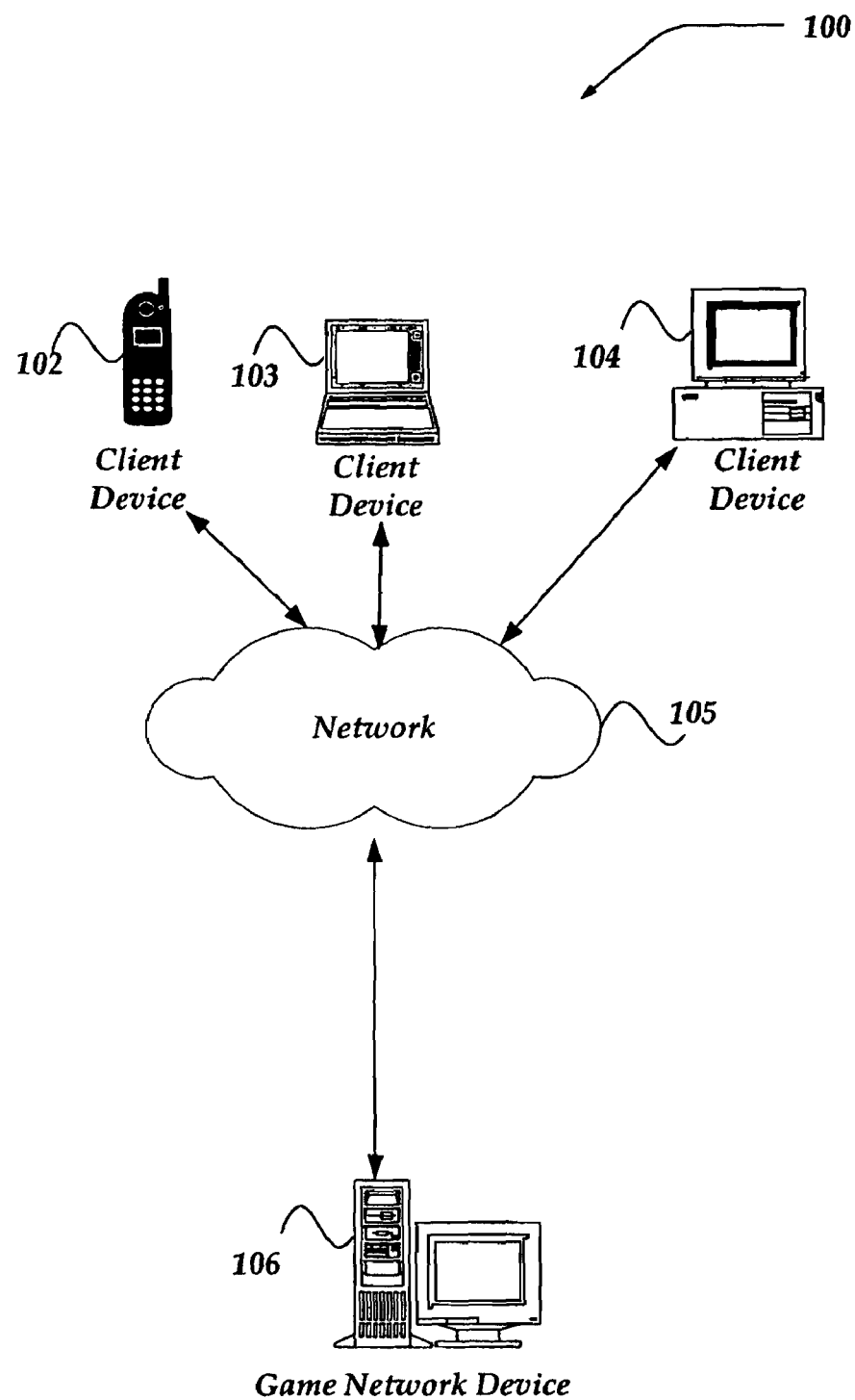
FIG. 1 is a diagram of a networked environment.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The use of pre-processing may greatly improve the quality of a graphical representation relative to the available processing power in a virtual environment, such as a video game, chat room, virtual world, movie, machinima, and the like. The utility of preprocessing greatly depends on the data available at a preprocessing stage. Thus, when rendering light, one may know the locations of light sources during the preprocessing stage. Fortunately, in most graphics applications, most light sources are usually static, and therefore are known at a preprocessing stage. For example, a computer game usually includes one or more environments or levels. These environments are predefined, and include predefined light sources. Thus, preprocessing may be performed when a predefined environment is being loaded in a computer gaming application.

Rendering the effects of lights on models poses additional problems, if preprocessing is to be used. As opposed to lights, models are almost always mobile, and usually interactive. Therefore, a model's position is usually not known during the preprocessing stage. Since the position of the model is important for calculating light effects on the model, calculating these effects during preprocessing is usually not done.

The present invention provides for using preprocessing calculations to assist in rendering the light effects on moving models. Thus, fewer calculations need to be made in real-time, the processing load is decreased, and the potential quality of the graphics is increased.

Illumination on models is determined utilizing ambient cubes. The ambient cube does not necessarily refer to an actual object, or data structure. It may also be an abstraction, used to visualize the present invention. For a particular pre-defined environment, a plurality of positions in the environment are chosen, the positions being relatively evenly dispersed in areas of the environment where models are expected to be placed in the future. For each such position, an ambient cube is defined.

During preprocessing, the light effects on each cube are computed and saved. This data is then used in real time, when determining the light effects on a model. The current position of a model and the data associated with the ambient cube closest to the model is used to compute the light effects on the model.

In order to select lights more suitable for use with an ambient cube, lights are divided into major lights and minor lights. The minor lights are rendered using an ambient cube. The major lights are rendered in real-time, allowing for a higher precision in rendering major lights. The number of major lights may be chosen based on performance requirements. The major lights are usually the lights that have the strongest effect on the model. Minor lights may include direct and indirect lights.

For each ambient cube, six cube vectors are defined, each being a unit vector normal to one side of the cube. Thus, the six cube vectors comprise three pairs of opposite normal vectors. The effect of all minor lights may be saved in six ambient cube values, each corresponding to a cube vector. The indirect minor lights are determined by sending plurality of reverse rays from the cube to detect light sources.

For each pixel to be drawn, light illumination may be determined by determining the light illumination contributed by each major light, determining the light illumination, contributed by the ambient cube based on the ambient cube value corresponding to the side of the model to which the pixel corresponds to, and adding the resultant light illuminations. Thus, compelling lighting of models may be achieved, without having to separately compute each light.

Lights illuminating a model are divided into major and minor lights. The number of major lights is predefined, and may depend on the desired quality of the renderings, the available processing power, the available hardware, and/or software libraries the usual lighting environment, and other factors. A number of major lights, suitable for the presently available hardware is two. The major lights are the lights having the most significant effect (i.e., strongest illumination) on the model. The other lights are defined as minor lights.

Each light is defined by a direction and illumination value. The direction value depends on the position of the light source relative to the model, while the illumination value, depends on the intensity of the light source. It may also optionally depend on the distance between the light source and the model, various values representing the opacity of the air, and other factors. Direction and illumination values for indirect light depend on other factors as well and are described in more detail below.

Direction and illumination values are usually represented by vectors. The direction of the vector corresponds to the direction value of a light, and its magnitude corresponds to the illumination value. These vectors, however, may be defined by a frame of reference. Two frames of reference may be used—static, (or world space), and tangent, (or tangent space). In the world space frame of reference, vectors may be defined in reference to a single set of three basis directions. In the tangent space frame of reference, each vector may be defined in reference to a set of basis directions dependent upon the surface orientation of an area on the model illuminated by the light whose direction the vector defines. In the present embodiment, the major lights are defined in tangent space, while the minor lights are defined in world space.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, network 105, and Game Network Device 106. Network 105 enables communication between client devices 102-104, and game network device 106.

Generally, client devices 102-104 may include virtually any computing device capable of connecting to another computing device to send and receive information, including game information, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Client devices 102-104 may further include a client application, and the like, that is configured to manage the actions described above.

Moreover, client devices 102-104 may also include a game client application, and the like, that is configured to enable an end-user to interact with and play a game, an interactive program, and the like. The game client may be configured to interact with a game server program, or the like. In one embodiment, the game client is configured to provide various functions, including, but not limited to, authentication, ability to enable an end-user to customize a game feature, synchronization with the game server program, and the like. The game client may further enable game inputs, such as keyboard, mouse, audio, and the like. The game client may also perform some game related computations, including, but not limited to, audio, game logic, physics computations, visual rendering, and the like. In one embodiment, client devices 102-104 are configured to receive and store game related files, executables, audio files, graphic files, and the like, that may be employed by the game client, game server, and the like.

In one embodiment, the game server resides on another network device, such as game network device 106. However, the invention is not so limited. For example, client devices 102-104 may also be configured to include the game server program, and the like, such that the game client and game server may interact on the same client device, or even another client device. Furthermore, although the present invention is described employing a client/server architecture, the invention is not so limited. Thus, other computing architectures may be employed, including but not limited to peer-to-peer, and the like.

Network 105 is configured to couple client devices 102-104, and the like, with each other, and to game network device 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), $4^{th}$ (4G) generation radio access for cellular systems, Wireless-LAN, Wireless Router (WR) mesh, and the like. Access technologies such as 2G, 3G, 4G and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), Code Division Multiple Access 2000 (CDMA 2000) and the like.

Furthermore, remote computers and other related electronic devices could be remotely connected to either LANs or WANs via a modem and temporary telephone link. In essence, network 105 includes any communication method by which information may travel between client devices 102-104 and network device 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Game network device 106 is described in more detail below in conjunction with FIG. 2. Briefly, however, network device 106 includes virtually any network device configured to include the game server program, and the like. As such, game network device 106 may be implemented on a variety of computing devices including personal computers, desktop computers, multiprocessor systems, microprocessor-based devices, network PCs, servers, network appliances, and the like.

Game network device 106 may further provide secured communication for interactions and accounting information to speedup periodic update messages between the game client and the game server, and the like. Such update messages may include, but are not limited to a position update, velocity update, audio update, graphics update, authentication information, and the like.

Illustrative Server Environment

Figure 2:
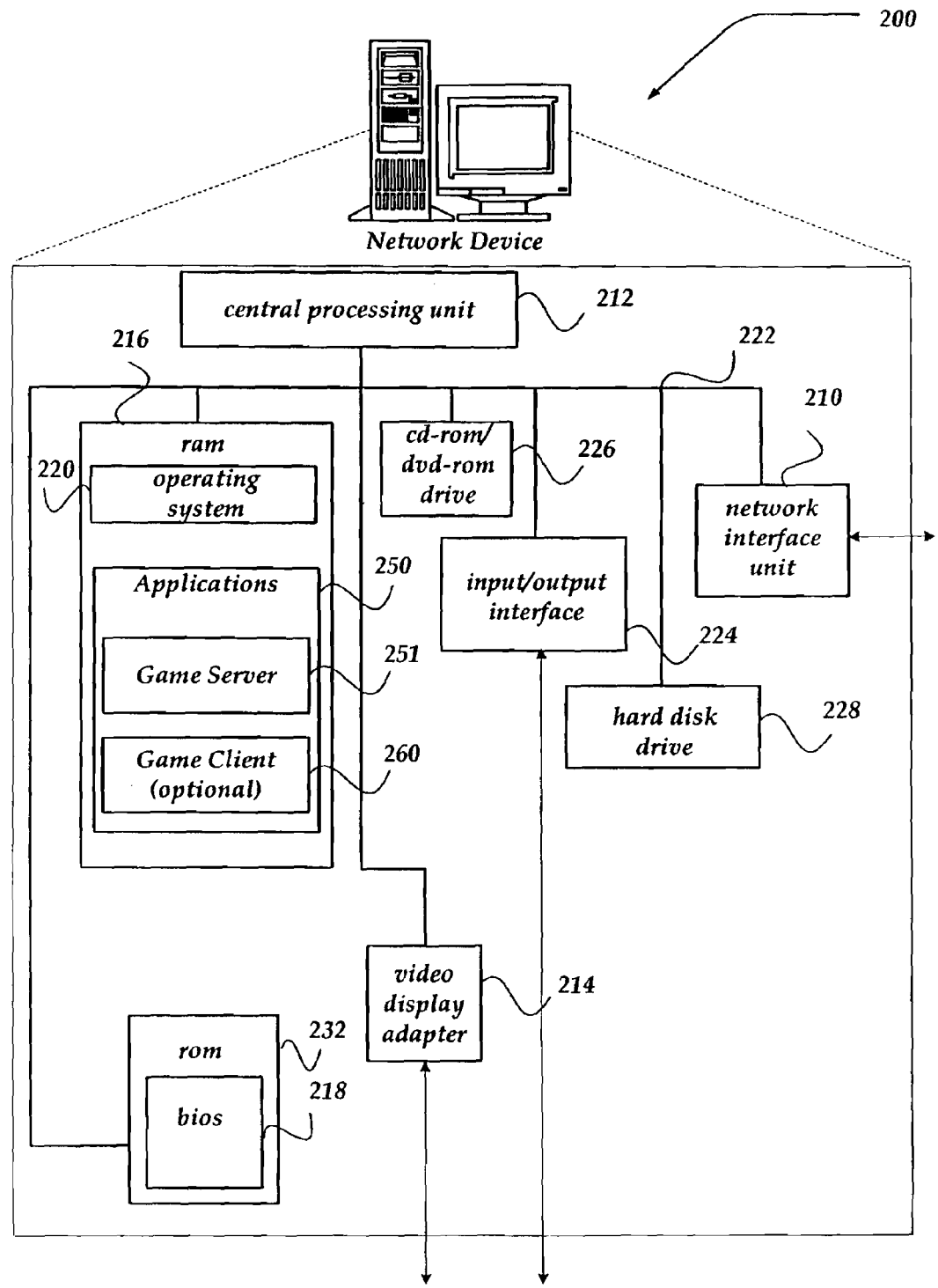
FIG. 2 is a diagram of a computer including a game application.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, game network device 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as client devices 102-104 of FIG. 1. Network interface unit 210 is sometimes known as a transceiver, network interface card (NIC), and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as game server 251 and optional game client 260.

Figure 3:
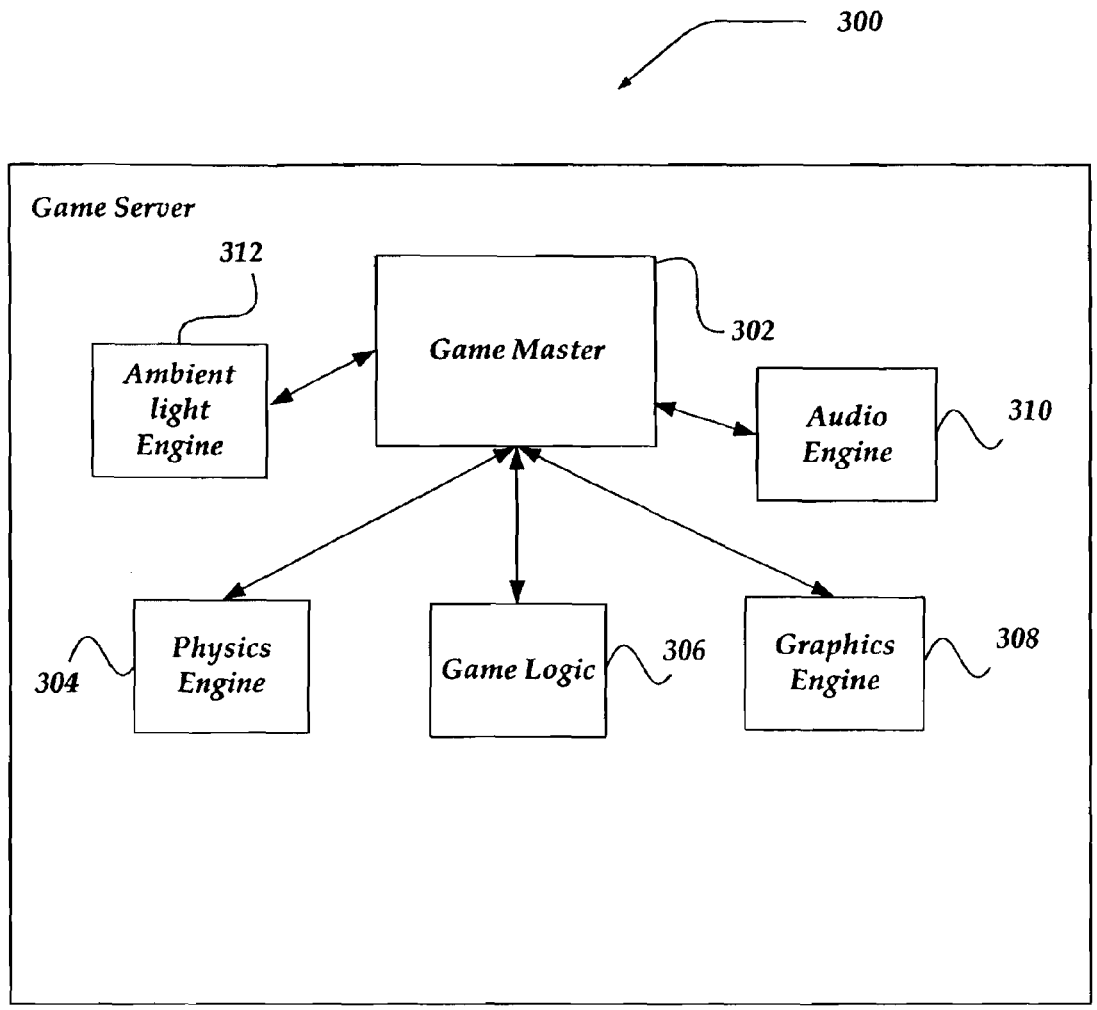
FIG. 3 is a diagram of a game application.

One embodiment of game server 251 is described in more detail in conjunction with FIG. 3. Briefly, however, game server 251 is configured to enable an end-user to interact with a game, and similar three-dimensional modeling programs. In one embodiment, game server 251 interacts with a game client residing on a client device, such as client devices 102-105 of FIG. 1 and/or optional game client 260 residing on network device 200. Game server 251 may also interact with other components residing on the client device, another network device, and the like. For example, game server 251 may interact with a client application, security application, transport application, and the like, on another device.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

FIG. 3 illustrates a function block diagram of one embodiment of a game server for use in game network device 106 of FIG. 1. As such, game server 300 may represent, for example, game server 251 of FIG. 2. Game server 300 may include many more components than those shown. The components shown, however, are sufficient to disclose an illustrative embodiment for practicing the invention. It is further noted that virtually any distribution of functions may be employed across and between a game client and game server. Moreover, the present invention is not limited to any particular architecture, and another may be employed. However, for ease of illustration of the invention, a client/server architecture has been selected for discussion below. Thus, as shown in the figure, game server 300 includes game master 302, physics engine 304, game logic 306, graphics engine 308, audio engine 310, and ambient light engine 312.

Game master 302 may also be configured to provide authentication, and communication services with a game client, another game server, and the like. Game master 302 may receive, for example, input events from the game client, such as keys, mouse movements, and the like, and provide the input events to game logic 306, physics engine 304, graphics engine 308, audio engine 310, ambient light engine 312, and the like. Game master 302 may further communicate with several game clients to enable multiple players, and the like. Game master 302 may also monitor actions associated with a game client, client device, another game server, and the like, to determine if the action is authorized. Game master 302 may also disable an input from an unauthorized sender.

Game master 302 may further manage interactions between physics engine 304, game logic 306, and graphics engine 308, audio engine 310, and ambient light engine 312. For example, in one embodiment, game master 302 may perform substantially similar to the process described below in conjunction with FIG. 7.

Game logic 306 is also in communication with game master 302, and is configured to provide game rules, goals, and the like. Game logic 306 may include a definition of a game logic entity within the game, such as an avatar, vehicle, and the like. Game logic 306 may include rules, goals, and the like, associated with how the game logic entity may move, interact, appear, and the like, as well. Game logic 306 may further include information about the environment, and the like, in which the game logic entity may interact. Game logic 306 may also included a component associated with artificial intelligence, neural networks, and the like.

Physics engine 304 is in communication with game master 302. Physics engine 304 is configured to provide mathematical computations for interactions, movements, forces, torques, collision detections, collisions, and the like. In one embodiment, physics engine 304 is a provided by a third party. However, the invention is not so limited and virtually any physics engine 304 may be employed that is configured to determine properties of entities, and a relationship between the entities and environments related to the laws of physics as abstracted for a virtual environment.

Physics engine 304 may determine the interactions, movements, forces, torques, collisions, and the like for a physic's proxy. Virtually every game logic entity may have associated with it, a physic's proxy. The physic's proxy may be substantially similar to the game logic entity, including, but not limited to shape. In one embodiment, however, the physic's proxy is reduced in size from the game logic entity by an amount epsilon. The epsilon may be virtually any value, including, but not limited to a value substantially equal to a distance the game logic entity may be able to move during one computational frame.

Graphics engine 308 is in communication with game master 302 and is configured to determine and provide graphical information associated with the overall game. As such, graphics engine 308 may include a bump-mapping component for determining and rending surfaces having high-density surface detail. Graphics engine 308 may also include a polygon component for rendering three-dimensional objects, and the like. Graphics engine 308 may further include an animation component, and the like. However, graphics engine 308 is not limited to these components, and others may be included, without departing from the scope or spirit of the invention. For example, additional components may exist that are employable for managing and storing such information, as map files, entity data files, environment data files, color palette files, texture files, and the like.

Audio engine 310 is in communication with game master 302 and is configured to determine and provide audio information associated with the overall game. As such, audio engine 310 may include an authoring component for generating audio files associated with position and distance of objects in a scene of the virtual environment. Audio engine 310 may further include a mixer for blending and cross fading channels of spatial sound data associated with objects and a character interacting in the scene.

Ambient light engine 312 is in communication with game master 302 and is configured to determine ambient light component for rendering ambient light effects in a virtual environment. As such, ambient light engine 312 may include an authoring component for generating ambient light effects.

In another embodiment, a game client can be employed to assist with or solely perform single or combinatorial actions associated with game server 300, including those actions associated with game master 302, ambient light engine 312, audio engine 310, graphics engine 308, game logic 306, and physics engine 304.

Illustrative Graphical Environment

Figure 4:
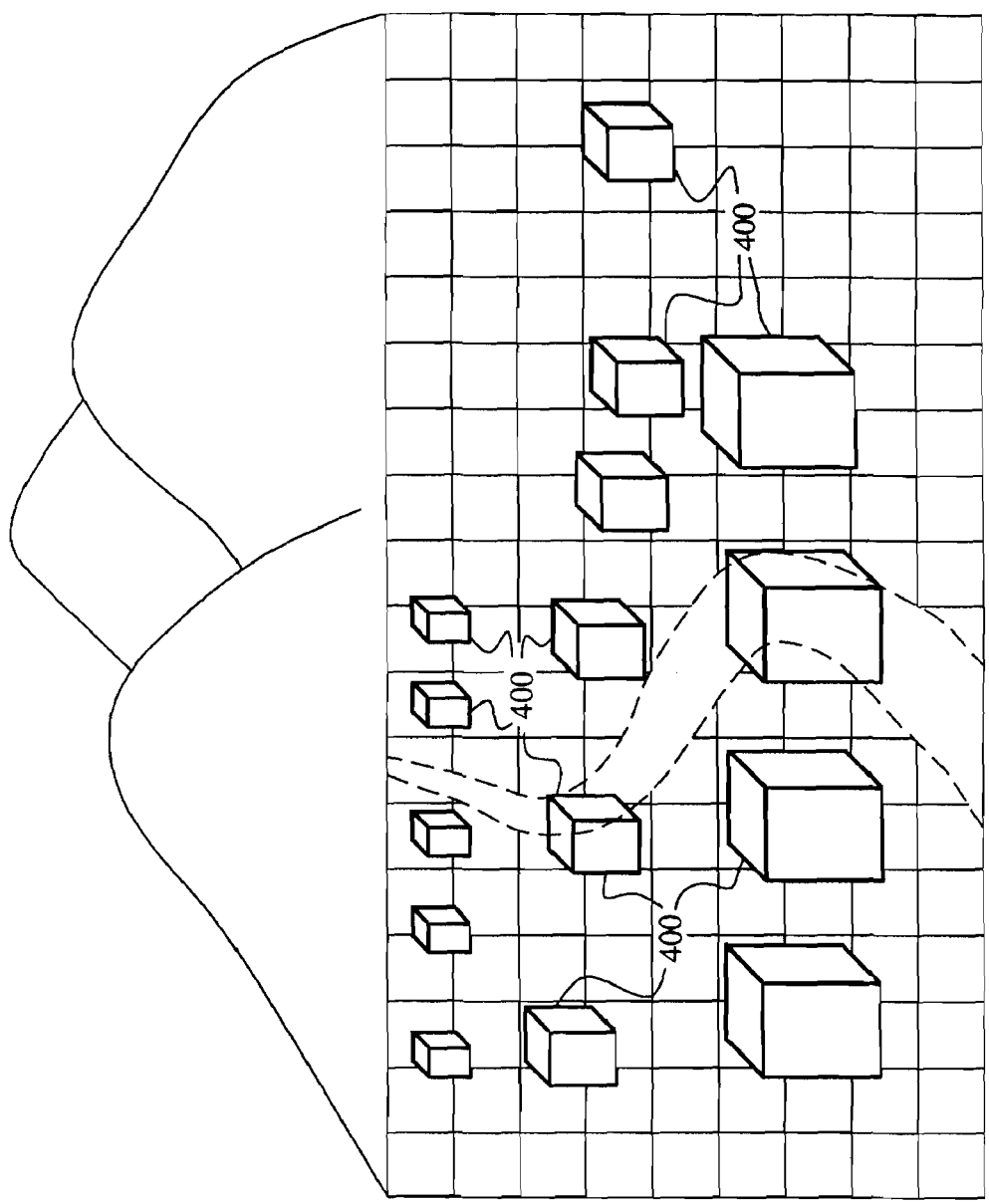
FIG. 4 is a diagram of a graphical environment with a plurality of ambient cubes placed therein.

FIG. 4 shows a graphical environment with a plurality of ambient cubes 400 placed therein. As it can be seen, the ambient cubes are placed in positions where the models are likely to be. In the embodiment depicted in FIG. 4, it is assumed that the models will appear on the ground. Thus the ambient cubes are placed in a grid on the ground of the environment. The light effects on each of these ambient cubes are calculated.

Figure 5:
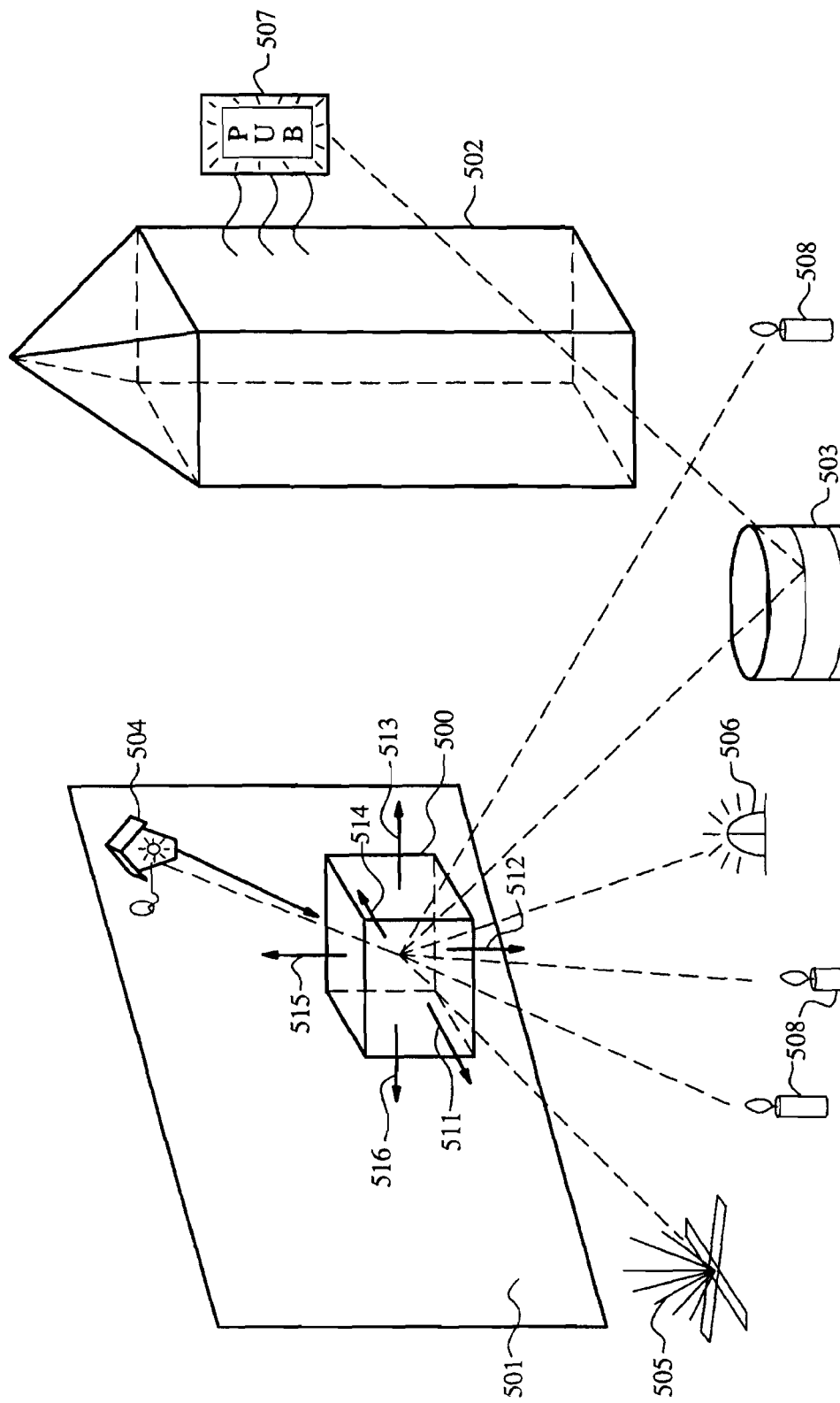
FIG. 5 is a diagram of the ambient cube in a graphical environment.

FIG. 5 is a diagram of a single ambient cube 500 in a graphical environment. Other ambient cubes are present in this environment as well; they are not shown for the sake of clarity. The environment includes various elements, such as a wall 501 a tower 502, and a barrel 503. Furthermore, the environment includes various light sources such as a street lamp 504, a fire 505, a siren 506, a neon sign 507, and plurality of candles 508.

Each light source, except for neon sign 507, directly illuminates the ambient cube 500. Neon sign 507 does not directly illuminate the ambient cube because the tower 502 is between neon sign 507 and the ambient cube. However, neon sign 507 may nevertheless indirectly illuminate the ambient cube. For example, its light may reflect off barrel 503 and illuminate the ambient cube. While direct illumination is easily detected, detecting indirect illumination is more difficult. Reverse rays are used to detect the indirect illumination on the ambient cube. Reverse rays take advantage of the fact that in a classical physics model, light rays traveling in opposite directions follow the same path. Thus, if a ray cast from the ambient cube encounters, after several reflections, a light source, such as neon sign 507, then rays emitted from the light source should illuminate the cube.

A plurality of reverse rays is emitted from the cube in various directions to search for indirect illumination sources. These reverse rays are hidden, i.e. they are not displayed as light rays in the resulting computer graphics. The number of reverse rays controls the likelihood that indirect illumination sources will be found. A number of reverse rays is 150. Each reverse ray is traced through a finite number of reflections off of various objects. The maximum number of reflections may be predetermined or calculated based on the reflection properties of the encountered objects. If a reverse ray encounters an indirect light source, the light contributed by the indirect light source is determined. The direction of the light is determined by using the initial angle of the reverse ray, and the magnitude of the light is determined by using the magnitude of the indirect light source as modified by the length of the reverse ray and the reflection properties of each object from which the reverse ray was reflected.

After all direct and indirect illumination sources are accounted for, the major illumination sources are chosen. This may be done by choosing the sources that effect illumination light of the greatest magnitude. In the example shown in FIG. 5, it is assumed that the number of major illumination sources is two and the major illumination sources are the street lamp 504, and the fire 505. The minor illumination sources are the remaining light sources—siren 506, candles 508, and indirect neon sign illumination source 507.

Six cube vectors are defined by ambient cube 500. Each cube vector is a unit vector which is normal to a respective side of the cube. Thus, vectors 511-516 are defined. An ambient cube value is defined for each vector, and initially set to zero.

Each minor light illuminating the cube is incident on one, two or three sides of the cube. That is, if the light is envisioned as a beam of parallel rays of light, the beam being wider than the size of the cube, then the beam will illuminate the cube on one, two, or three of the cube's sides. In other words, for a light L illuminating the cube there exist one, two or three cube vectors C, such that:

$$L \cdot C < 0.$$

These three vectors are referred to as the relevant cube vectors. For each minor illumination source causing a light L(i), and each relevant cube vector C(j), the ambient cube value associated with the relevant cube vector A(j) is incremented as follows:

$$A(j) = A(j) + (-L(i) \cdot C(j))$$

Figure 6:
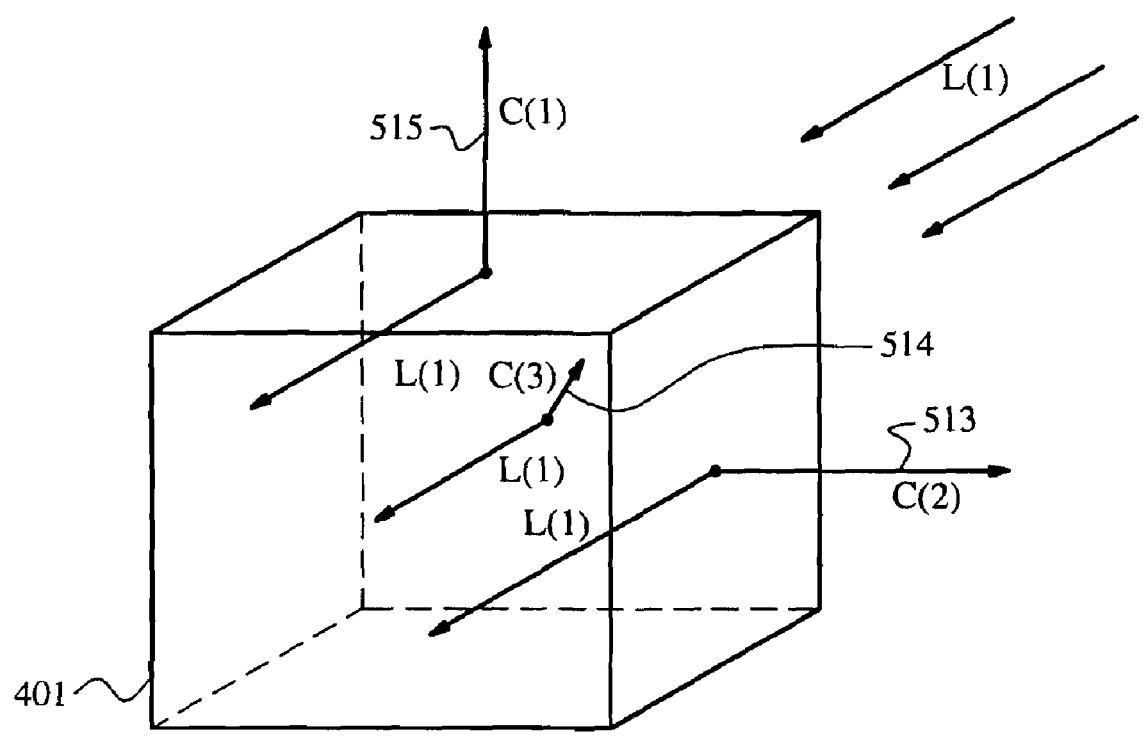
FIG. 6 is a diagram of the ambient cube showing a single light illuminating three sides of the cube.

The negative sign may be employed where the light vector is usually in a direction generally opposite that of the illumination vector. The negative sign may be omitted if different cube vectors are used (i.e., vectors directed towards the inside of the cube). This process is shown in detail in FIG. 6 as it applies to a single light L(1) which illuminates cube 500 from the top-right-rear. Thus, the relevant vectors are top 515, right 513 and rear 514 vectors (C(1), C(2) and C(3), respectively). The dot product of each vector and L(1) is taken and used to increment the corresponding ambient cube value, so that:

$$A(1) = A(1) + C(1) \cdot L(1)$$

$$A(2) = A(2) + C(2) \cdot L(1)$$

$$A(3) = A(3) + C(3) \cdot L(1).$$

Note that the direction of light L(1) is used to determine which sides of the cube it illuminates. A comparison of the width of the ray with the size of the cube may not be made, as it is assumed that the ray encompasses the whole cube.

Once all the minor light sources are processed in the above described manner, ambient cube values A(1)-A(6) hold values representing the total light illumination from minor light sources of the cube on each of its respective sides. The same calculations are performed for all ambient cubes that are placed in the environment (see FIG. 4). These calculations are performed in preprocessing. The values A(1)-A(6) associated with each cube are stored in an array.

The illumination of the model by the major light sources may be determined in real time using any of a variety of mechanisms. After a major source illumination value for a pixel on the model is thus determined, that illumination value is augmented to take into account the effect of the minor light sources. First, the current position of the model is noted, and the ambient cube at a position closest to the current position of the model is selected. Then, the illumination value of the pixel is augmented by taking into account the values A(1-6) of the ambient cube. This may be done in several ways. A simple and fast approach may be to associate the pixel with a side of the ambient cube, depending on which side of the model the pixel is positioned at. Then the illumination of the pixel is modified in accordance with the value A(j) associated with that particular side of the ambient cube. Alternatively, the surface orientation of the pixel may be taken into account, and several sides of the ambient cube may be considered. The model may be treated as placed entirely inside the ambient cube, each side of the cube illuminating the model with rays orthogonal to the surface of that side and having intensities according to the A(j) value for that side. The illumination of the pixel may then be modified according to known formulas for calculating such illumination.

An optional computation step may be taken to increase the precision of the ambient cube computations. Depending on the density of the ambient cubes, it is likely that the current position of the model does not coincide with a predefined ambient cube. In this case, instead of merely using the values for the closest ambient cube, two or more of the closest ambient cubes are taken into account. The values for these closest cubes are weighted according to the distance between each cube and the model, and then averaged. These are referred to as effective ambient cube values and are used to modify the illuminations for pixels of the model as described above.

Illustrative Flow Chart

Figure 7:
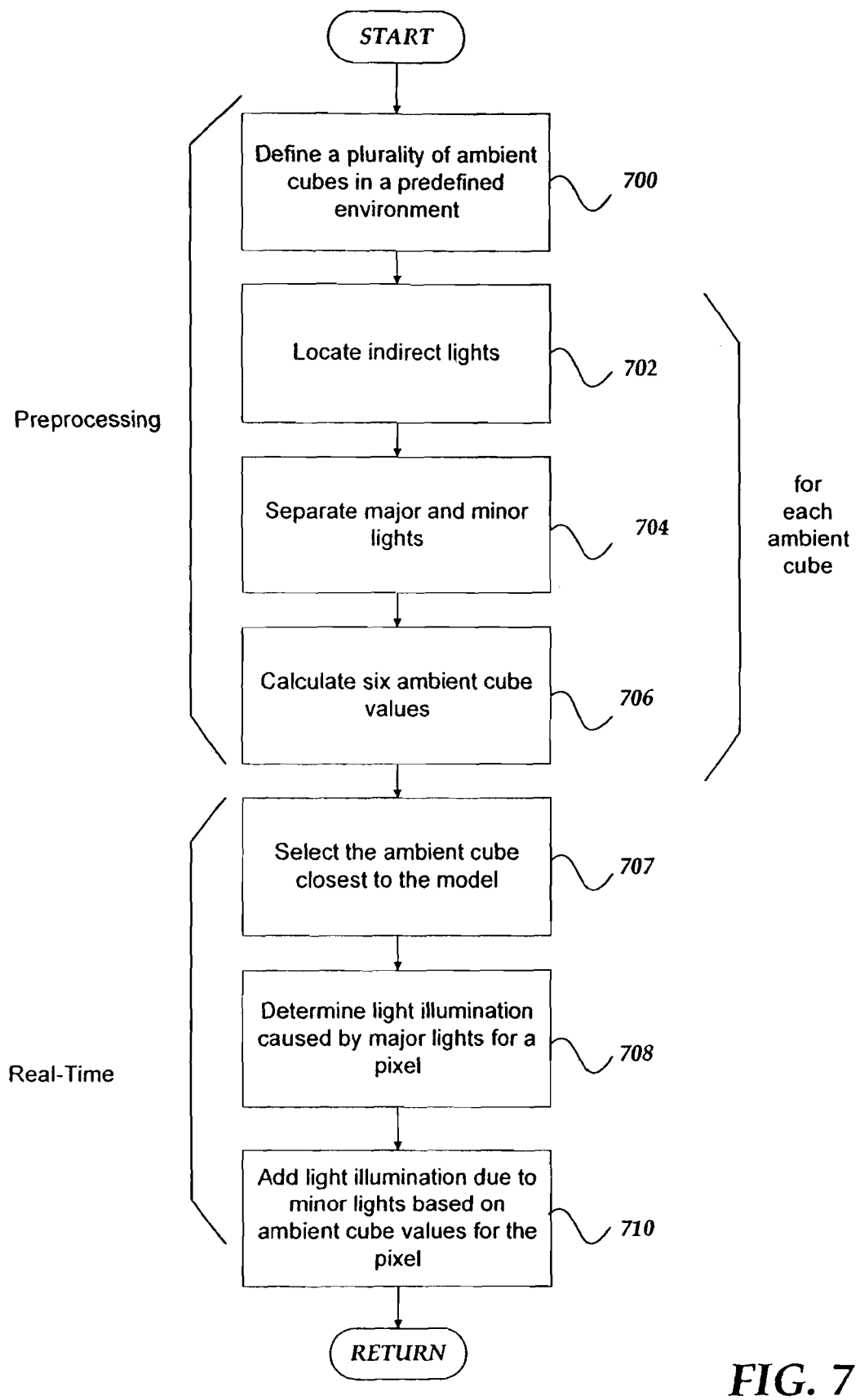
FIG. 7 is a flow chart showing one embodiment of a process of calculating illumination values for a model.

FIG. 7 is a flow chart showing the above described approach of determining illumination values for a model. Blocks 700-706 are performed during preprocessing. At block 700, a plurality of ambient cubes are defined in relation to an existing model. Blocks 702-706 are performed for each of these ambient cubes. In block 702, indirect lights are located by using reverse rays. In block 704, the major lights are determined and logically separated from the minor lights. In block 706, six ambient cube values are calculated so they aggregate the effect of the minor lights on the respective sides of the cube. Blocks 707-710 are performed in real time. In block 707, the ambient cube closest to an existing model is selected. In block 708, the illumination caused by major lights on a pixel of the model is determined. In block 710, the illumination determined in block 708 is modified to include the effects of the minor lights based on the values of the selected ambient cube. Steps 708 and 710 are performed for each visible pixel on the model.

From the above disclosure, it can be seen that the ambient cube is merely a framing device. Thus, the present invention may be used in conjunction with six vectors, similar to the cube vectors, (i.e., wherein the vectors form three pairs of opposite vectors, the pairs lying on three perpendicular lines) even if a cube is not present. Furthermore, additional modifications of the above described embodiments are readily apparent in light of the laws of mathematics and geometry. These modifications are part of the present invention.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

While the foregoing description and drawings represent illustrative embodiments of the present invention, it will be understood that various changes and modifications may be made without departing from the spirit and scope of the present invention.

What is claimed as new and desired to be protected by Letters Patent of the United States is:

1. A computing system for displaying a graphical model comprising:
   a processor that employs instructions to perform actions, including:
      determining a plurality of framing abstractions in a virtual environment, wherein the framing abstractions having n-sides with n being an integer value greater than two;
      for each framing abstraction, determining major and minor lights from a plurality of lights incident to the framing abstraction;
      for each framing abstraction, calculating ambient values, each ambient value being related to an aggregate light illumination at a respective side of the framing abstraction by the minor lights, and associating the ambient values with the framing abstraction;
      selecting a framing abstraction based on a location of the model;
      determining the light illumination caused by the major lights for a pixel of the model; and
      modifying the determined light illumination by a value related to one or more of the ambient values associated with the selected framing abstraction; and
   a display screen arranged to display the model based on the modified light illumination.

2. The computing system of claim 1, further comprising:
   defining framing vectors each normal to a side of the framing abstraction;
   for each light, determining a vector representing the light and one of the framing vectors; and
   aggregating the resulting vectors into an ambient value associated with the normal vector.

3. The computing system of claim 1, wherein the graphical model represents a computer game model within the virtual environment.

4. The computing system of claim 1, wherein the display screen is associated with a client device remote from the processor.

5. The computing system of claim 1, wherein data useable in displaying the model based on the modified light illumination is communicated over a network.

6. A system for determining light illumination for a model comprising:
   a network device having a processor and a memory, the memory comprising an application configured to:
      defining a plurality of framing abstractions in a virtual environment;
      for each framing abstraction, dividing a plurality of lights incident to the framing abstraction into major and minor lights;
      for each framing abstraction, calculating ambient values, each ambient value being related to an aggregate light illumination at a respective side of the framing abstraction by the minor lights, and associating the ambient values with the framing abstraction;
      selecting a framing abstraction based on a location of the model;
      determining the light illumination caused by the major lights for a pixel of the model; and
      modifying the determined light illumination by a value related to one or more of the ambient values associated with the selected framing abstraction; and
   a client device that is configured and arranged to perform actions, including employing the modified light illumination to modify a display of the model.

7. The system of claim 6, wherein each framing abstraction further comprises an n-sided polygon, wherein n is greater than two.

8. The system of claim 6, wherein the application is configured to perform actions, further comprising:
   for each light, determining a vector product of a vector representing the light and one of the framing vectors normal to a side of the framing abstraction; and
   aggregating the resulting vector product into an ambient value associated with the normal vector.

9. The system of claim 6, wherein the model is displayed within a game application.

10. The system of claim 6, wherein the network device employs at least one secure connection in which to communicate with the client device.

11. A game device for use in displaying a model comprising a computer having a processor and a memory, the memory comprising an application configured to perform actions, including:
   defining in a virtual environment a plurality of framing abstractions having a plurality of sides;
   for each framing abstraction, determining major and minor lights from a plurality of lights incident to the framing abstraction;
   for each framing abstraction, determining ambient values, each ambient value being related to an aggregate light illumination at a respective side of the framing abstraction by the minor lights, and associating the ambient values with the framing abstraction;
   determining effective ambient values by taking the average of the ambient values of the two or more framing abstractions weighted by a distance between each framing abstraction and the model;
   determining the light illumination caused by the major lights for a pixel of the model;
   modifying the model based on using the determined light illumination modified by a value related to one or more of the effective ambient values; and
   displaying the modified model on a display screen.

12. The game device of claim 11, wherein each framing abstraction further comprises an n-sided visualization polygon, wherein n is an integer value greater than two.

* * * * *